M. SEMOFF.
ROAD CLEARING ATTACHMENT FOR VEHICLES
APPLICATION FILED JUNE 23, 1920.

1,367,923.                                    Patented Feb. 8, 1921.

Inventor,
Meyer Semoff,
By Frederick V. Winters
Attorney.

UNITED STATES PATENT OFFICE.

MEYER SEMOFF, OF WEST HOBOKEN, NEW JERSEY.

ROAD-CLEARING ATTACHMENT FOR VEHICLES.

1,367,923.  Specification of Letters Patent.  Patented Feb. 8, 1921.

Application filed June 23, 1920. Serial No. 391,236.

*To all whom it may concern:*

Be it known that I, MEYER SEMOFF, a citizen of the United States, and resident of West Hoboken, in the county of Hudson and State of New Jersey, have invented certain new and useful Improvements in Road-Clearing Attachments for Vehicles, of which the following is a full, clear, and exact specification.

This invention relates to attachments for automobiles or other vehicles for clearing the road in front of pneumatic tires in order to prevent the puncture thereof by pieces of glass, nails or other articles often encountered in the road.

It is the aim of this invention to provide a device for this purpose which may be easily and quickly attached to any automobile so as to sweep in advance of each tire or wheel. Another object is to provide the attachment with means permitting the sweeper to be displaced by an obstruction in the road too large to be removed thereby. Other objects will appear as the description proceeds.

The invention will be first hereinafter described in connection with the accompanying drawings which constitute part of this specification, and then more specifically defined in the claims at the end of the description.

In the accompanying drawings, wherein similar reference characters are used to designate corresponding parts throughout the several views:—

Figure 1:
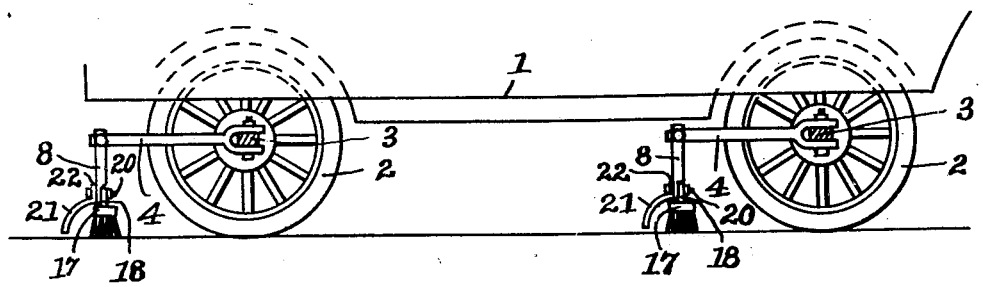
Figure 1 is a side elevation of the lower portion of an automobile showing the axles in section and road clearing devices attached thereto.

In Fig. 1 the lower portion of the body of an automobile or other vehicle is indicated at 1 supported by wheels mounted on axles 3 and having pneumatic tires 2. The road sweeping or clearing attachments are fastened to said axles adjacent the wheels so that the sweepers are supported directly in front of the tires.

Figure 2:
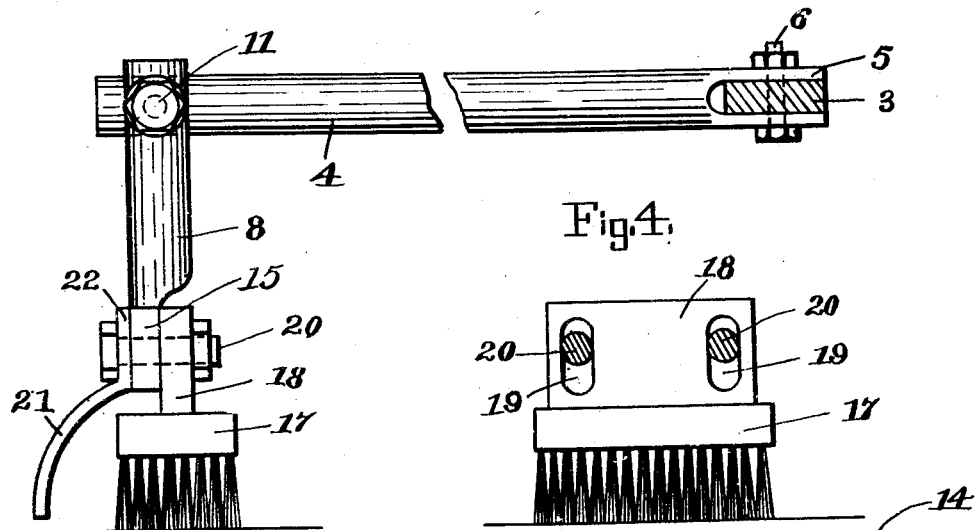
Fig. 2 is a side view of the attachment on a larger scale.
Figure 4:
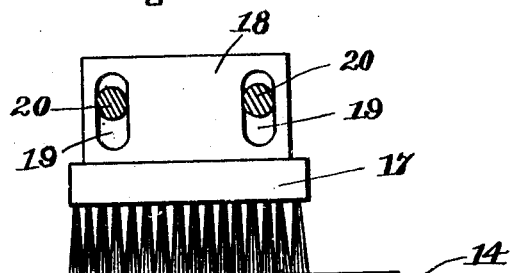
Fig. 4 is a detailed view of the brush showing the bolts for adjustably securing the same to the bracket of the attachment in section.
Figure 3:
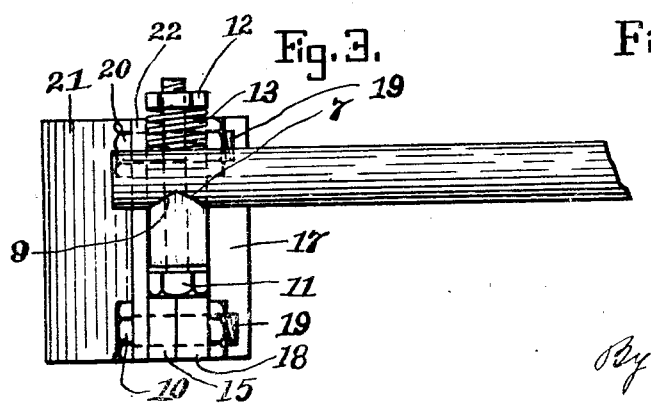
Fig. 3 is a plan view of the outer end portion of said attachment.
Figure 5:
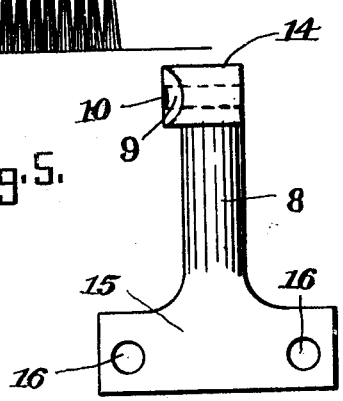
Fig. 5 is a detailed view of the vertical arm or member of the bracket.

Each attachment comprises a horizontally extending arm 4 which is bifurcated at one end to clamp upon the axle as at 5, Fig. 2, said clamp being drawn together so as to firmly embrace the axle by a bolt 6. The other end portion of the arm 4 has a vertically extending V-shaped notch or groove 7, Fig. 3, formed in its side, with a hole bored through the center thereof to receive a bolt 11 which also extends through a hole in the upper end portion of a vertical arm 8 having a V-shaped rib to fit in said V-shaped notch 7 of the horizontal arm. A coiled spring 13 is interposed between the horizontal arm and a nut 12 on the bolt 11 for yieldingly holding said rib in engagement with said notch.

On the lower end of the vertical arm there is a plate portion 15 having holes 16 for the passage of bolts 20. These bolts also engage slots 19 in the head 18 of a brush 17 and the upper plate portion 22 of an arched fender 21, the latter extending in front of said brush for protecting the brush from large obstructions in the road. The slots 19 in the head of the brush are elongated vertically to permit of adjustment to correspond with wheels of different diameters, so that said brush may also be arranged so as to just touch the road.

Inasmuch as one of the brushes is designed to be carried in front of each tire, it will be seen that particles of glass or other damaging articles in the road will be displaced or thrown to one side by said brushes so that said tires will not go over them and be injured thereby. In case larger pieces of glass or rock are encountered, the fenders 21 will throw them to one side and prevent them from coming in contact with the brushes. Should large articles, such as cannot be displaced by the fender or brush, be encountered, the vertical arm 8 will yield and swing out of the way, the V-shaped rib riding up the sides of the V-shaped groove or notch 7. After such an obstruction has been passed, the spring 13 will automatically return the arm 8 to normal position by drawing the V-shaped rib back again into seated position in the notch.

Having thus described my invention, what

I claim as new and desire to secure by Letters Patent of the United States is:—

1. In a road clearing device of the character described, the combination with an arm to be attached to a vehicle, of another arm depending from the first arm and having road engaging means at its lower end, said depending arm being connected to the first arm by a yielding swivel joint which permits it to swing out of the way of large obstructions in the road.

2. In a road clearing device, the combination with an arm to be attached to a vehicle, of a depending arm carrying road engaging means and connected to said first arm by a yielding swivel joint comprising a V-shaped rib on one arm to engage a correspondingly shaped notch in the other arm, and a bolt passed through said arms and the rib and notch, there being a spring mounted on one end of the bolt for yieldingly pressing said rib into said notch.

In testimony whereof I have signed my name to this specification.

MEYER SEMOFF.